Oct. 20, 1970  J. H. FILLOUX  3,535,538
OPTICAL LEVER, AND DETECTING SYSTEM AND PLATE ASSEMBLY
FOR USE THEREWITH
Filed Oct. 25, 1966  4 Sheets-Sheet 1
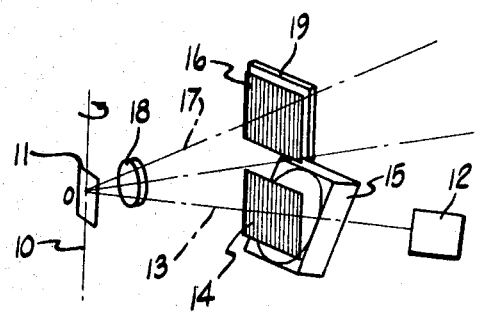
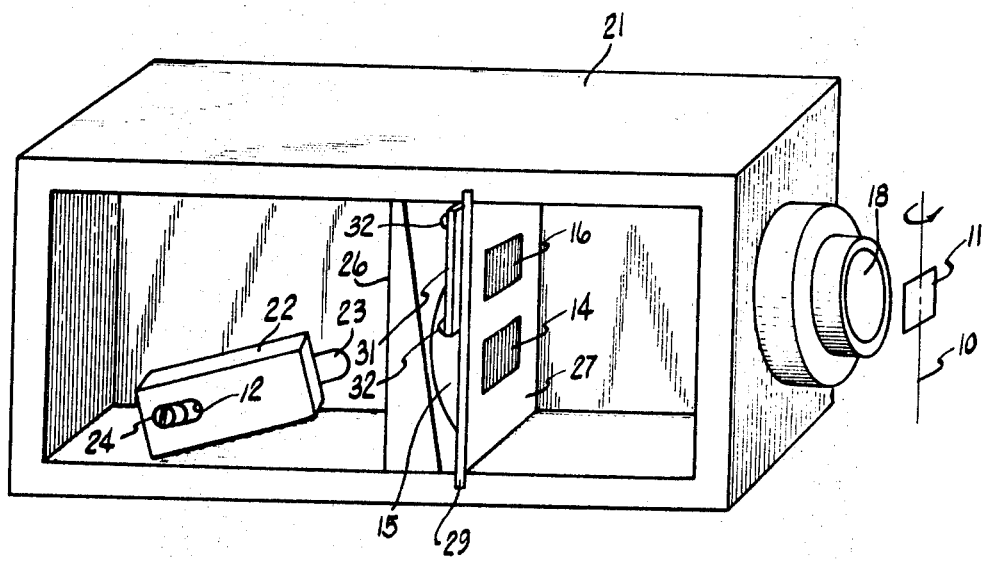
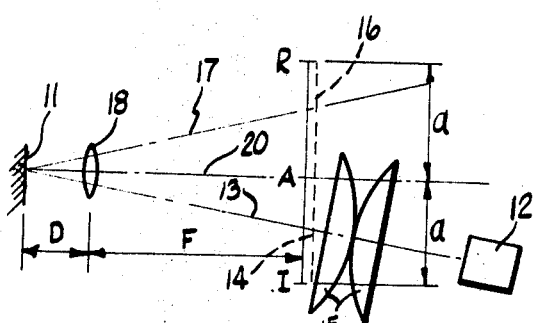
Inventor
JEAN H. FILLOUX Oct. 20, 1970  J. H. FILLOUX  3,535,538
OPTICAL LEVER, AND DETECTING SYSTEM AND PLATE ASSEMBLY
FOR USE THEREWITH
Filed Oct. 25, 1966  4 Sheets-Sheet 2
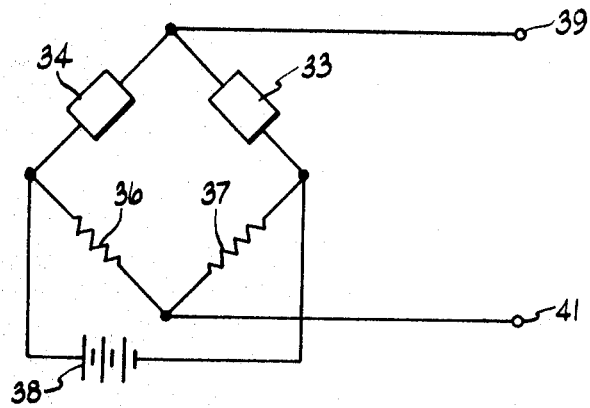
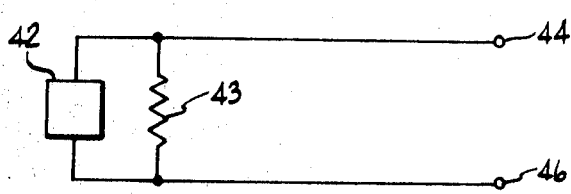
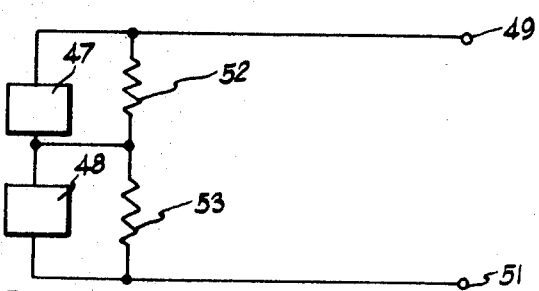
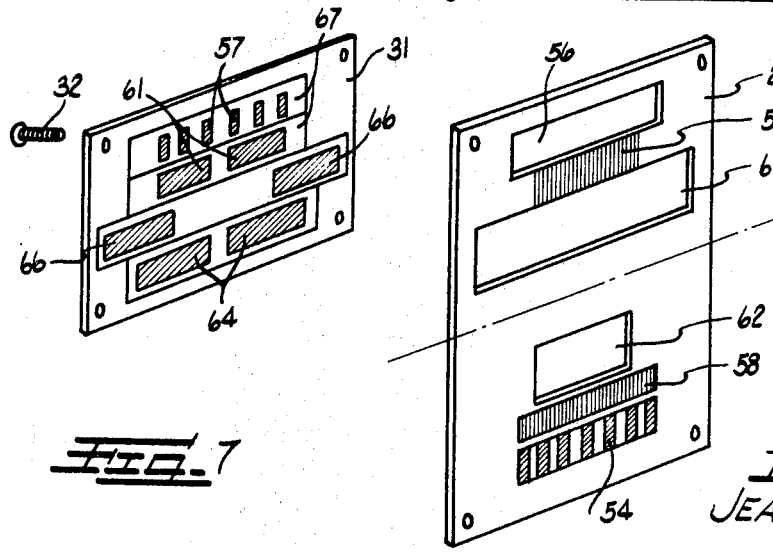
Inventor
JEAN H. FILLOUX
By Anderson, Luedeka, Fitch, Even, & Tabin  Attys.

Oct. 20, 1970  J. H. FILLOUX  3,535,538
OPTICAL LEVER, AND DETECTING SYSTEM AND PLATE ASSEMBLY FOR USE THEREWITH
Filed Oct. 25, 1966  4 Sheets-Sheet 3

Inventor
JEAN H. FILLOUX

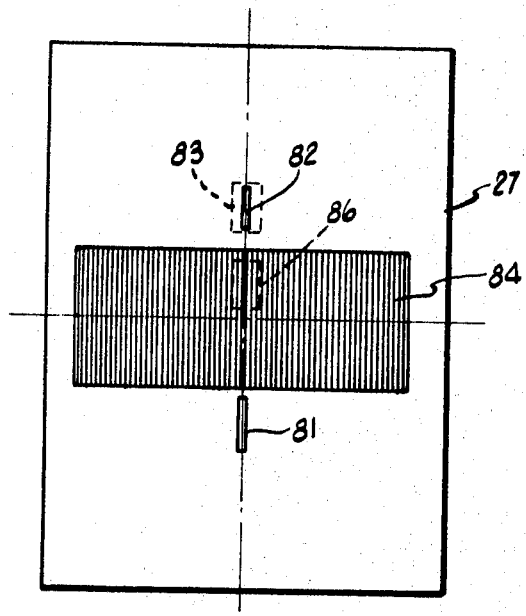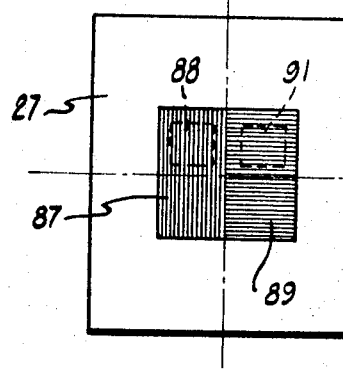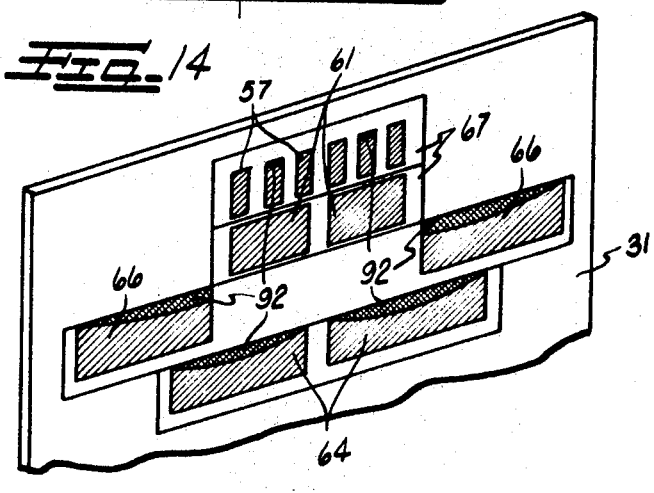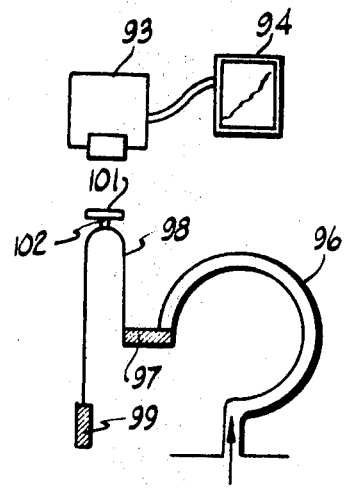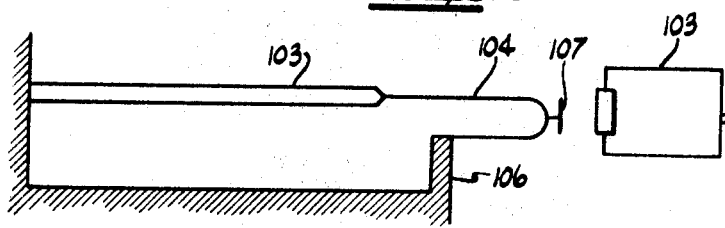

United States Patent Office 3,535,538
Patented Oct. 20, 1970

1

3,535,538
OPTICAL LEVER, AND DETECTING SYSTEM AND
PLATE ASSEMBLY FOR USE THEREWITH
Jean H. Filloux, La Jolla, Calif., assignor, by mesne assignments, to Gulf General Atomic Incorporated, San Diego, Calif., a corporation of Delaware
Filed Oct. 25, 1966, Ser. No. 589,298
Int. Cl. G01d 5/30
U.S. Cl. 250—230         14 Claims

ABSTRACT OF THE DISCLOSURE

An optical lever for detecting angular displacement includes optical gratings positioned in both the incident and reflected paths wherein one optical grating has opaque bars of larger dimension than the other to provide periodic variation in intensity of the reflected light beam. A modification shows an optical lever which is sensitive to angular displacement in two mutually perpendicular axes of rotation.

---

This invention relates to detecting and measuring devices and, more particularly, to an optical lever for detecting and measuring the angular displacement of a mirror about an axis of rotation. This invention also relates to a measuring and detecting system which utilizes an optical lever.

The optical lever has been known in the art for many years, having been invented by Poggendorf in 1826. Basically, the optical lever is used for detecting and measuring the angular displacement of a mirror about an axis of rotation. The mirror is attached to an element, such as the beam of a torsion balance or a Bourdon tube, the movement of which is to be detected or measured.

Optical levers have been utilized for a variety of purposes over the years, and have served as important instruments in many notable experiments of classical physics. The optical lever is capable of achieving extremely high sensitivity and the literature includes descriptions of optical levers capable of detecting an angular displacement as small as $10^{-10}$ radians. In fact, the Brownian movement of the suspended coil of a galvanometer has been detected in experimental data obtained by the use of an optical lever.

Because of their extreme sensitivity, optical levers have found, and continue to find, considerable use in various scientific experiments. As improved components have become available, the sensitivity and reliability of optical levers has correspondingly increased. Thus far, however, optical levers have primarily been built specifically for a given experimental purpose and a high quality optical lever designed for universal application has not heretofore been commercially available. The latter type of instrument may be of valuable assistance as a measuring instrument in many types of industrial applications where a specially built instrument would be of prohibitive cost.

It is a general object of this invention to provide an improved optical lever for detecting and measuring the angular displacement of a mirror about an axis of rotation.

Still another object of the invention is to provide an optical lever which is capable of a variety of applications.

A further object of the invention is to provide an optical lever which exhibits high sensitivity over a wide dynamic range.

A still further object of the invention is to provide an optical lever which is highly versatile in application in that its characteristics may be readily altered to suit particular needs.

A more particular object of the invention is to provide

2 an optical lever capable of detecting and measuring rotation of a mirror about more than one axis.

Still another object of the invention is to provide an optical lever of sturdy construction and low cost.

A still further object of the invention is to provide an improved measuring and detecting system for utilizing an optical lever.

Other objects and the various advantages of the invention will become apparent to those skilled in the art from the following description taken in connection with the accompanying drawings wherein:

FIG. 1 is a perspective schematic view of an optical lever constructed in accordance with the invention;

FIG. 2 is a perspective view of a preferred construction for the optical lever of the invention;

FIG. 3 is a schematic diagram illustrating the preferred dimensional relationships in the optical lever of the invention;

FIG. 4 is a schematic diagram of a circuit incorporating passive light responsive devices for use in connection with the invention;

FIG. 5 is a schematic diagram of an alternative circuit utilizing an active light responsive device for use in connection with the invention;

FIG. 6 is a schematic diagram of an alternative circuit incorporating two active light responsive devices for use in connection with the invention;

FIG. 7 is a perspective exploded view of an alternative arrangement for certain elements of the device shown in FIG. 2;

FIGS. 10 through 13 are plan views illustrating alternative arrangements for the element of the optical lever illustrated in FIG. 8;

FIG. 14 is a perspective partial view illustrating an alternative arrangement for the other one of the elements of the optical lever shown in FIG. 7;

FIG. 15 is a schematic view showing a pressure measuring and detecting system using an optical lever; and FIG. 16 is a schematic view showing a strain detecting and measuring system using an optical lever.

Figure 8:
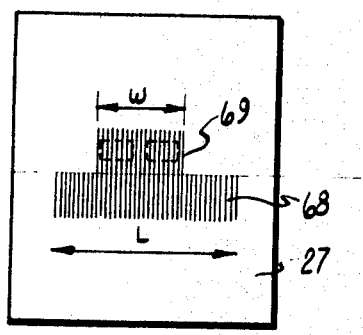
FIG. 8 is a plan view illustrating an alternative arrangement for one of the elements of the optical lever shown in FIG. 7.

Very generally, the optical lever of the invention is for detecting the angular displacement, from a reference position, of a mirror 11 about an axis of rotation 10. The optical lever includes a light source or lamp 12 adapted to produce an incident light beam which is directed at the mirror. The axis of the incident light beam is designated at 13. The axis of the reflected light beam is designated at 17. A sensing assembly 19 is positioned to be in the path of the light beam reflected from the mirror at a predetermined displacement of the mirror for sensing impingement of the reflected light beam. Depending upon construction details subsequently discussed, the presence of impinging light or the size of the area upon which it impinges will correspond to a given displacement of the mirror. The light source and the sensing assembly are positioned so that, with the mirror in the reference position and the optical lever operating, the axis of the incident light beam and the axis of the reflected light beam are in a plane which is generally parallel with the axis of rotation of the mirror.

In a preferred embodiment, a first opaque member 14 is positioned in the path of the incident light beam for partially obstructing same. A second opaque member 16 is displaced from the first opaque member to be in the path of the light beam reflected from the mirror for partially obstructing the reflected beam. Accordingly, the angular displacement of the mirror causes a variation in the cross sectional area of the reflected light beam impinging upon the transducer means, due to variation in the amount by which the image of the first opaque member is superimposed upon the second opaque member.

The optical lever of the invention is illustrated schematically in FIG. 1. The mirror 11 is mounted to a movable element, not shown, such element being responsive to the particular phenomenon being detected or measured. The optical lever is of advantage in detecting and measuring very minute changes in various physical phenomena such as pressure, force, strain, temperature, direction, etc. Actually, the optical lever is capable of detecting and measuring changes in any physical quantity that can be made to cause angular displacement of a mirror. Such phenomena as the expansion of crystals under X-ray bombardment and the presence of infrared rays, have been measured by means of an optical lever. Another application of an optical lever is for use as a refractometer for detecting the presence of gases by detecting small changes in the refractive index of the atmosphere when such gas is present.

The movable element to which the mirror is attached may, for example, be a Bourdon tube in the case of pressure measurement, or the beam of a torsion balance or the coil of a galvanometer for electrical measurements. The mirror need not be directly attached to such element but may be attached to an intermediate element comprising part of a linkage which affords some mechanical amplification or gain. It is preferred that the mirror be a planar front surface mirror.

The optical lever of the invention includes a light source 12 adapted to produce an incident light beam directed at the mirror. The light source may be of any suitable type, and it is desirable that the light source be one which supplies a light of constant intensity. A preferred light source is a radiating diode, which produces a nearly monochromatic light. This minimizes limitations on sensitivity and linearity, with the light wave length characteristics herein applicable, due to chromatic aberration in parts of the optical system described below. A miner's lamp may also be satisfactory as a light source. In order to insure that the light from the light source is of relatively constant intensity, it may be desirable that current be supplied to the light source through a suitable current regulator, not shown.

A condenser 15 is disposed between the light source 12 and the mirror 11. The condenser comprises a concave lens which operates to collimate the rays of the beam, that is, to make the light rays mutually parallel. The result is that the incident beam is of uniformly lighted cross section directed at the mirror. The area of this uniformly lighted cross section will depend upon the size and shape of the condenser lens.

A first or incident side opaque member 14 is positioned in the path of the incident beam for partially obstructing the beam. The opaque member 14 is shown in FIG. 1 as comprising an optical grating having a plurality of parallel opaque bars or grids, the spacing, orientation, size, and area of which may be a variety of configurations. Alternatively, the opaque member may comprise an opaque plate having a window therein, the shape of which is selected to obstruct a certain portion of the incident beam. Some possible configurations of gratings and windows are discussed subsequently.

Many optical gratings or windows may be made easily and inexpensively by photoetching. A more precise method of fabrication, particularly in the manufacture of optical gratings having very fine parallel bars, involves the depositing of an opaque coating on a glass support plate and subsequently cutting the desired portions of the opaque coating away with suitable equipment.

A second or reflected side opaque member 16 is positioned displaced from the first opaque member 14 to be in the path of the light beam reflected from the mirror 11. The second opaque member may be identical with the first, or may be of one of a variety of configurations, as is discussed more fully subsequently in this specification. The second opaque member may be fabricated by any of the techniques discussed in connection with the fabrication of the first opaque member. For reasons which will be explained more fully subsequently, it is preferred that the first and second opaque members be coplanar.

The objective lens 18 is positioned to focus an image of the first opaque member 14 on the mirror and to focus the reflected image of the first opaque member in the plane of the second opaque member 16. The objective lens in FIG. 1 provides unit magnification so that an image of the first optical grating 14 may be superimposed on the second optical grating 16. The grating patterns are selected so that the amount of light passing the second optical grating will vary according to the angular deflection of the mirror 11. For example, assuming the first and second optical gratings to be identical, if the image of the first optical grating is focused exactly in superimposed position on the second optical grating, a maximum amount of light will pass the second optical grating. On the other hand, if the position of the mirror is such that the image of the first optical grating will be focused on the spaces between the bars of the second optical grating, the amount of light passing the second optical grating will be minimum.

Upon sufficient movement of the mirror 11, the amount of light passing the second optical grating will vary between its minimum and maximum values. One cycle from minimum to maximum amounts of light passing the second optical grating corresponds to the first order range of mirror displacements which can be recognized by utilizing identical parallel bar optical gratings wherein the spacing and size of the bars is uniform throughout. As will be explained in detail subsequently, however, variations in the shape and spacing of the bars of the optical gratings, together with variation in the configuration of the gratings themselves, make it possible to recognize much wider angular displacements of the mirror than those within the first order range. Moreover, as will be pointed out subsequently, detecting and measuring techniques utilizing other forms of opaque members, besides optical gratings, offer advantages under certain circumstances.

A sensing or transducer assembly 19 is positioned behind the second opaque member 16, preferably immediately adjacent thereto. By placing the transducer assembly in this position, the need for further prisms or lenses between the transducer assembly and the second opaque member is obviated. The transducer assembly, as will be explained in greater detail subsequently, includes one or more light responsive devices or light sensors, such as photocells or solar cells, positioned to intercept the reflected light beam immediately past the second opaque member. The position of the light responsive device or devices is predetermined, according to the type of opaque members used, to provide either a digital pulse determined by the impingment of light, or an analog output determined by the area of the light responsive device upon which the reflected light beam impinges. This pulse or output will correspond to a given displacement of the mirror. Specific examples of this technique are explained in detail further on in this specification. In the case of solar cells and photocells, a varying electrical signal is provided in accordance with the amount of light impinging thereon, which, in turn, will depend on the direction of the reflected light beam and the configuration of the opaque members.

The light source 12 and the light sensors of the transducer assembly 19 are positioned with respect to each other and the mirror 11 so that, with the mirror in a reference or zero center position, the axis 13 of the incident light beam and the axis 17 of the reflected light beam lie in a plane which is generally parallel with the axis of rotation 10 of the mirror 11. Thus, a normal to the plane of the mirror (assuming a planar mirror) will move or oscillate in a plane which is approximately perpendicular to the plane of the light beam axes, at least insofar as the component of mirror displacement being detected is concerned. Preferably, with the mirror in a rest of reference position, the incident and reflected beam axes are coplanar with the axis of rotation of the mirror.

The advantage of this arrangement lies in the fact that the increase of the required field angle of the objective lens 18, with increasing mirror displacement, is minimized. The required field angle of the objective lens 18, with the beam and rotation axes coplanar at reference, will increase in proportion to the square root of the angular displacement of the mirror. Since the quality of most lenses deteriorates rapidly as higher field angles are used, the arrangement of the invention is increasingly advantageous as the angular displacement of the mirror increases. In many applications, the ability to handle large rotation angles as well as extremely small ones is of prime importance, and the optical lever of the invention has this ability.

In addition to keeping the required field angle for the objective as small as possible, the optical lever of the invention is capable of discriminating completely against any motion of the mirror 11 other than rotations around the particular axis 10 desired. The optical lever will thereby effectively discriminate against changes in the distance of the mirror to the objective 18. Since all fine wire suspensions, of which the galvonometer suspension is a well known example, require unrestrained lateral displacement of the mirror, the ability to discriminate against such movement is an important feature in the optical lever.

To illustrate this fact, in the optical lever shown in FIG. 1, a change of the mirror to objective distance creates a slight shift of the image of the incident optical grating 14 with respect to the reflected side grating 16. Because the light beam axes 13 and 17 are in a plane parallel with the axis of rotation 10 of the mirror 11, and because the bars of the optical gratings 14 and 16 are parallel with the axis 10, the image shift is in a direction parallel to the direction of the bars of the optical gratings. There is, therefore, no change in the amount of illumination of the light responsive devices. It should be noted that the shift referred to is a consequence of the finite thickness of the objective lens and is not predictable by thin lens theory.

In connection with the sensitivity of the optical lever of the invention, the maximum achievable sensitivity increases with the fineness of the optical gratings used. The fineness of the optical gratings, however, is limited by the achievable resolution of the objective lens. Thus, when the active area of the second optical grating 16 is large and the grid spacing very small, the aberration characteristics of an otherwise very sharp objective may limit the fineness of the usable grating by destroying the coherence of the relationship between the grids of the incident grating image and those of the reflected side optical grating. On the other hand, if the active area of the second optical grating is kept small enough in relation to the grid spacing, lens cutting techniques are capable of producing lenses so sharp that the only limitation on the fineness of the optical gratings is caused by diffraction due to the finite size of the mirror (or of the image of the light source on the mirror).

As previously pointed out, when optical gratings are used in the optical lever, displacement of the mirror causes variation between maximum and minimum in the amount of light passing the reflected side grating. For a given objective lens, the portion of this minimum-maximum variation which has a linear relation to the mirror displacement becomes smaller with increasing fineness of the optical gratings until it falls to zero. At this point, the instrument characteristic is entirely nonlinear. The grid spacing at which the optical lever characteristic loses any linearity approximates the following relationship:

$$d_{\min.} = \frac{2wF}{M}$$

where $d_{\min.}$ is the minimum usable grid spacing, $w$ is the wave length of the light beam, F the focal length of the objective and M the mirror size (or the size of the filament image).

Another limitation upon the resolution of the optical lever lies in the noise associated with the particular light responsive devices used. Silicon solar cells are considerably superior to photo conductors for studies of mirror oscillation periods longer than a few seconds. This is because the drift characteristics of silicon solar cells are approximately 20 times better than the drift characteristics of the best photo conductors. For shorter periods, that is, periods lasting from between a few tenths of a second to a few seconds, photo conductors may be satisfactory. At higher frequencies, photo conductors are not usable because of their slow response, whereas silicon solar cells are effective far beyond the kilocycle range. In addition to their superior signal-to-noise ratio and faster response, solar cells provide certain physical advantages in that their flat thin shapes and the lack of a need for any protective envelope (except possibly a thin transparent covering) facilitates compact construction of the optical lever. The capsule around a photo conductor contributes to large temperature fluctuation by obstructing the escape of the heat generated by the light falling on the photo conductor.

For certain purposes, it is highly desirable to keep the light beam intensity in the optical lever free from fluctuations. This is best achieved by keeping the optical lever at constant temperature and, as previously mentioned, by regulating the light source current. It is preferred that the optical lever characteristics for heat dissipation, and the current regulator for the light source be designed so that relative current variations are kept smaller than a factor of approximately $10^{-5}$ within one hour or less.

Among the several advantages of the optical lever of the invention, it has been found that excellent reproducibility of readings is possible. By using silicon solar cells as light responsive devices, sensitivities in the optical lever of the invention have been found to be as high as $10^{-8}$ radian for long observation times, and near $10^{-9}$ radian for observation times shorter than 1 second.

Referring now more particularly to FIG. 2, the structural aspects of the optical lever of the invention are illustrated. Although the device shown in FIG. 2 is a preferred construction for the optical lever of the invention, it is to be understood that other structural embodiments are possible which do not depart from the spirit and scope of the present invention. As shown in FIG. 2, the optical lever includes a housing 21 constructed of metal or other suitable material. The housing should be made as small as possible consistent with the required displacement of the elements of the optical lever in order to minimize convection currents in the air inside the housing. Convection currents result in an irregularity of the refractive index of the air in the path of the incident and reflected light beams. In addition to minimizing convection currents, a relatively small housing will minimize any undesired changes in the distance between components due to thermal expansion. Finally, the housing should be as rigid as possible to avoid unintentional shifting in components due to outside forces and vibration.

The light source 12 is contained in a sub-housing 22 mounted inside the main housing 21. The main housing 21 includes a slot 23 in a wall thereof. The slot 23 is machined at the precise angle of the axis of the incident beam and the light source sub-housing 22 is mounted by suitable bolted adjusting studs (not visible) in the slot 23. Thus, the position of the light source with respect to the housing may be adjusted. The light source itself is mounted in a suitable socket not visible, which is in turn mounted in the sub-housing 22 by means of a mounting screw 24.

The condensing lens 15 is contained in a condensing lens sub-housing 26. The sub-housing 26 is secured by suitable means, not shown, to the main housing 21 and mounts the condensing lens rigidly in place at the desired angle and location.

The incident and reflected side gratings, 14 and 16 respectively, are supported on a single planar rigid plate 27. Arrangements other than optical gratings may also be utilized, as is explained below. The plate 27 is mounted and located in the housing 21 by means of a pair of transverse slots 28 and 29 in the top and bottom of the housing. The slots in the housing are machined to the precise dimension required for locating the plate 27 and the plate may be mounted in the housing simply by sliding it in from the open side. If necessary, a clamping device, not shown, may be utilized to clamp the plate 27 against a locating surface in the slots. In any case, it is preferable that the plate 27 be readily removable from the housing 21 to facilitate replacement of the plate with others of different configuration, as is described more fully at a later point in this specification.

The transducer assembly is located immediately behind the reflected side optical grating 16 on a transducer assembly plate 31. The plate 31 is bolted to the plate 27 by means of bolts 32 and carries light responsive devices, such as photocells or solar cells, which are disposed immediately behind the optical grating 16. Suitable electrical connection, not illustrated in FIG. 2, may be made to the light responsive devices supported by the plate 31 for providing an electrical indication of the amount of light passing the optical grating 16.

It is preferred that the plate 27, and the transducer assembly plate 31 attached thereto, be readily removable as a unit from the housing 21. In this manner, the entire plate assembly (of both plates 27 and 31) constitutes an interchangeable element. Plate assemblies may be designed to fit various detecting and measuring needs, as will be discussed more fully subsequently, and hence the optical lever becomes an extremely versatile detecting and measuring instrument.

In order to maximize the uniformly lighted cross sectional area of the incident and reflected light beams, and thus make it possible to simultaneously utilize several grating or window pairs, and in order to maximize the sensitivity of the optical lever, a particular arrangement of the various components of the optical lever is used in the invention. This arrangement is illustrated in FIG. 3. In accordance with this arrangement, the light source and the objective and the transducer assembly are positioned so that the angle between the axis of the incident light beam and the axis of the reflected light beam is equal to twice the arc tangent of the following quotient: the dimension of the largest area of the grating plane which can be uniformly lighted by the condenser lens divided by the sum of the focal length of the objective lens and the distance betwen the objective lens and the mirror. Referring more particularly to FIG. 3 and to a mathematical presentation of the relationships therein illustrated, the preferred angle of opening between the axis 13 of the incident beam and the axis 17 of the reflected beam ⊖ optimum) is given by the following formula:

$$\ominus \text{ optimum} = 2 \text{ arc tan } A/(F+D)$$

In the above expression, A is the width of the largest area of the grating plane which can be uniformly lighted by the condenser, F the focal length of the objective, and D the distance from the objective to the mirror. In addition to allowing the maximum number of grating pairs, this preferred arrangement causes the boundaries of the incident and reflected side grating plate areas to meet at the optical axis 20 of the objective 18. Since the optical axis of the objective is the area of its highest resolution, immediately adjacent gratings on this line will be in the most sensitive position possible. In the event that several grating pairs are used, sensitivity of the optical lever may be optimized by placing the most sensitive grating pair in this position.

Although there are many possible circuit arrangements for sensing the light passing the reflected side opaque member or grating 16, three possible arrangements will be explained in detail herein for the purpose of thoroughness. The arrangement shown in FIG. 4 utilizes a pair of passive light responsive devices or sensors, such as photo cells. In utilizing such a sensing arrangement in connection with optical gratings, it is preferred that the second or reflected side optical grating be split into two halves separated by a width of one of the bars in the gratings. By doing so, the amount of light passing one-half of the grating will increase, whereas the light passing the other half will decrease, as the mirror is displaced angularly. One of the photocells 33 is disposed behind one-half of the reflected optical grating and the other photocell 34 is disposed behind the other half of the reflected optical grating. The two photocells 33 and 34 are connected in a Wheatstone bridge which includes a pair of resistors 36 and 37. A source of direct current potential 38 is connected across two opposite corners of the bridge and the output is derived across terminals 39 and 41 connected to the other two opposite corners of the bridge. The sensitivity of such a bridge circuit will be unaffected by variations in the brightness of the light source 12 if the direct current source 38 supplies a constant current. The bridge is balanced at a reference position of the mirror and rotation of the mirror from the reference position will result in an imbalance of the bridge, producing an output across the terminals 39 and 41. This output may be amplified and utilized in any desired manner, for example, to deflect the stylus of a chart recorder.

FIG. 5 illustrates the use of an active light responsive device or sensor, such as a solar cell, in an unbalanced output circuit. In this case, a single active light responsive device 42, having a load resistor 43 connected thereacross, provides an output potential across the terminals 44 and 46. The second or reflected optical grating need not be divided into two halves as was the case with the configuration of FIG. 4. The light responsive device 42 may be placed directly behind the reflected side grating, and the reflected side grating may be identical with the incident grating.

In FIG. 6, the use of two active light responsive devices or sensors is illustrated. The light responsive devices 47 and 48 are disposed behind respective halves of a divided reflected side optical grating similar to that described in connection with the passive light responsive devices of FIG. 4. A change in the angle of the mirror causes an imbalance in the current output of the two cells 47 and 48. This current imbalance is sensed as a potential difference across the terminals 49 and 51. If desired, load resistors 52 and 53 may be connected across the respective active light responsive devices 47 and 48.

Various other output circuit configurations than the particular configuration utilized may be selected in accordance with the sensitivity and type of output desired. Where two light sensitive devices are utilized in a balanced or bridge output, it is not necessarily required that the split type of reflected grating be utilized as described above. For example, in the output circuit of FIG. 6, one of the light responsive devices 47 or 48 may be placed behind a window in the gating plate which is large enough so that the light falling thereon remains unchanged despite rotation of the mirror. The other light responsive device may be placed behind an optical grating and the circuit designed for balance when the incident optical grating is exactly superimposed upon the reflected side optical grating. In such an arrangement, when rotation of the mirror occurs, one of the light responsive devices senses a decrease in light passing the second optical grating, whereas the other light responsive device provides a constant output. A current imbalance would therefore result and produce an output across the terminals 49 and 51.

As mentioned before, there is an extensive variety of possible arrangements for the optical gratings or windows and for the positioning of the light responsive devices or sensors with respect thereto. FIG. 7 illustrates one such possible arrangement. It should be noted that the configuration or arrangements of the gratings, windows and light sensors shown in FIG. 7 is not optimized in accordance with the previous discussion connected with FIG. 3. FIG. 7 is presented as illustrative of how a variety of ranges and sensitivities may be attained in a single instrument when the optical gratings and light sensors are so arranged as to utilize several portions of the light beam cross section of uniform illumination in different manners.

In FIG. 7, the configuration of the optical gratings and light sensors shown utilizes three portions of the reflected light beam cross section. The uppermost one of these portions passes through the window 56 and corresponds to the lowest portion of the incident light beam, the latter portion passing through the optical grating 54. A plurality of light sensors 57, mounted on the light sensor plate 31, are disposed immediately behind the window 56. The size of the sensors 57 is selected to match the size and shape of the opaque parallel bars of the optical grating 54 and the spaces between the parallel bars of the grating 54 are of the same width as the bars. With the mirror in its reference position, the three light sensors 57 furthest to the right in FIG. 7 are positioned so that the right-hand part of the image of the opaque bars of the grating 54 is superimposed on the spaces between the light sensors. The three right-hand light sensors 57 will therefore sense the maximum possible amount of light since their surface areas are totally illuminated. The three light sensors 57 furthest to the left in FIG. 7 are spaced so that the left-hand part of the image of the opaque cross bars of optical grating 54 is superimposed on the light sensors. These latter three light sensors will therefore sense the minimum possible amount of light since none of their surface areas will be illuminated. Each trio of the light sensors 57 may be attached in series to operate as a single light responsive device and may be utilized in an output circuit of the type shown in FIG. 6. Displacement of the mirror 11 from its reference position will cause a shift of the superimposed image of the optical grating 54 with respect to the sensors 57. Each trio of sensors will thereby sense a change in the illuminated areas thereof, producing an output.

The next adjacent portions of the incident and reflected light beams in FIG. 7 pass through the incident grating 58 and the reflected side grating 59, respectively, on the plate 27. A pair of light sensors 61 are mounted on the light sensor plate 31 and are disposed immediately behind the reflected side optical grating 59. The reflected side grating 59 may be in two halves, offset by the width of one of the opaque grating bars, this technique being described above. Thus, as the mirror is angularly displaced, the amount of light reaching one of the light sensors 61 will increase while the amount of light reaching the other will decrease. The light sensors 61 may then be connected in a suitable bridge or balanced output circuit of the types previously discussed in connection with FIGS. 4 and 6.

The remaining portions of the incident and reflected light beams pass through a rectangular incident side window 62 and a rectangular reflected side window 63, respectively. The window 62 is considerably smaller than the window 63 in the dimension transversely of the plane of the light beam axes. The window 62 is designed of a size to cause the plate 27 to block some of the incident light beam and thus only a portion of the window 63 is illuminated. Two pairs of light sensors 64 and 66 are mounted to the light sensor mounting plate 31 immediately behind the window 63. The light sensors 66 are spaced farther from each other than the light sensors 64. The light sensors 64 and 66 may be suitably connected in a bridge circuit or balanced output circuit to provide an analog indication of mirror displacement. At rest position, the size of the window 62 is selected so that neither of the light sensors 66 is illuminated and so that the images of its opposite edges, respectively, fall down the middle of the light sensors 64. Thus, approximately half of each of the light sensors 64 is illuminated. Upon displacement of the mirror, one of the light sensors 64 senses greater illumination while the other senses less illumination. At sufficient mirror displacements, one or the other of the light sensors 66 will become increasingly illuminated depending upon the direction of mirror displacement. By suitable electrical connection, an analog indication of mirror position may be achieved.

It should be noted that each of the groups or pairs of light sensors 57, 61, 64 and 66 is mounted on a respective single strip 67 of material having a high heat conductivity. Each strip 67 is positioned directly between a group of light responsive devices or sensors and the mounting plate 31 therefor. The sensors on the more illuminated portions of the plate 31 receive more heat than the others and eventually become warmer. This effect can be detrimental to the study of slowly changing processes. The heat conductive strips 67 reduce the effect of heating by acting as heat distributors, keeping all of the sensors in a given group at nearly the same temperature, regardless of the amount of light that is impinging upon each one.

An arrangement of the general type illustrated in FIG. 7, that is, the utilization of portions of the light beams for different purposes, permits the combination of many optical lever characteristics in a single instrument. This arrangement also permits an extension of the range of the instrument with the various range outputs being simultaneously available. For example, a single instrument may be designed to provide four ranges of amplitude, each differing by a factor of 10.

Further, as mentioned above, the overall characteristics of the optical lever of the invention may be readily changed and adapted to new requirements by merely pulling out the assembly of the plates 27 and 31 and replacing it with an assembly of plates having a different arrangement of optical windows, gratings and light sensors. Such an exchange takes only seconds, with all other components of the instrument remaining as they were before. The only additional cost involved is, therefore, the cost of the new plates and light sensors. Because it is possible to utilize a multiplicity of different grating, window and sensor arrangements in a single plate assembly, replacement of the plate assembly is needed only when substantial changes of characteristics are desired. The gratings, windows and light sensors need to be properly positioned only once, when they are fastened to the supporting plates. The alignment between the incident and reflected side optical gratings or windows is thereafter preserved and displacement of the mounting plate assembly does not affect the relative positions between the optical gratings, windows and sensors.

Particular optical grating pairs or window and sensor arrangements may be designed to provide special characteristics. Some examples of optical grating designs and window and sensor arrangements for particular characteristics are shown in FIGS. 8, and 10 through 13. The arrangements shown and described in these figures are designed for extending the range of the instrument, for providing high sensitivity near balance, for identifying mirror position, for digitalizing the output, and for measuring separate modes of rotation simultaneously. The invention, however, is not limited to all or any one of these specific arrangements and such are shown only as particular and unique examples of arrangements which may be utilized.

In FIG. 8, the rectangular incident grating 68 of the optical grating pair is made larger in the dimension transverse to the plane of the light beam axes than the corresponding dimension of the rectangular reflected side grating 69. Thus, although for a given objective the maximum range of unbalance of light sensors from full negative to full positive balance is limited by the spacing of the opaque bars in the optical gratings, deflections of the mirror beyond this maximum range can be sensed with accuracy. This is because the optical lever continues to sense the mirror deflection beyond the maximum range of unbalance with the same accuracy but with a change of sign of the slope of the recorded signal. Theoretically, the maximum number of times reversal may occur without any degradation of accuracy is equal to:

$$\frac{L-w}{p}$$

where L is the width of the incident grating, $w$ the width of the reflected side grating, and $p$ the length of the portion of image displacement having a linear relation to mirror displacement. The latter is determined as set out previously.

The range of angular displacement of the mirror between maximum and minimum unbalance of light sensors (i.e., full negative to full positive unbalance) is equivalent to the expression $g/8f$; where $g$ is the distance between corresponding edges of the bars of the optical grating (the grating spatial periodicity) and $f$ is the focal length of the objective lens. By way of example, this range of angular displacement, for an objective focal length of 10 cm. and a grating spatial periodicity of 0.1 cm. is equal to $1.25 \times 10^{-3}$ radian. If, however, the incident grating is made 1 cm. wider than the reflected side grating, a twentyfold increase in range angle occurs.

Figure 9:
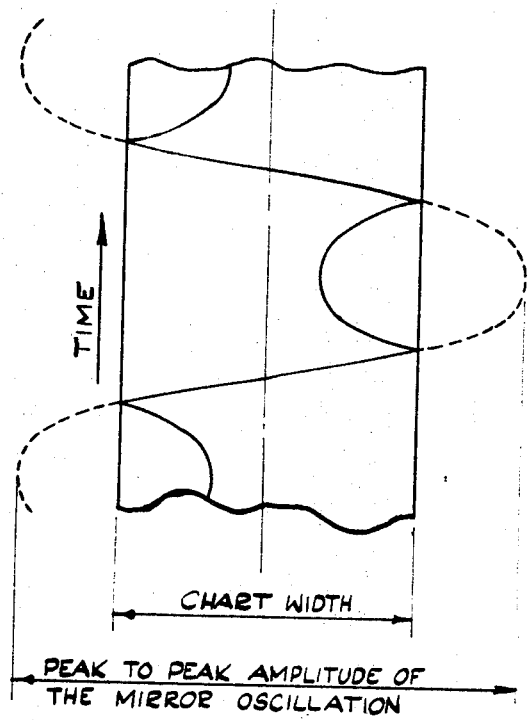
FIG. 9 is a graph illustrating the operation of the optical lever of the invention using an element as shown in FIG. 8.

If the range of deflection of the mirror is contained within the width of a recorder chart, deflections larger than the maximum unbalance range continue to be recorded on the chart paper. As may be observed from FIG. 9, deflections beyond the maximum unbalance appear as though reflected back onto the chart by the chart margin. The sinusoidal oscillation recorded on the chart illustrated in FIG. 9 has a measurable peak amplitude considerably wider than the chart width. Thus, the optical lever output may be kept within the width of a recorder chart, or within the range of a voltmeter, with no degradation of sensitivity and with no need for special adjustments even at large displacements of the mirror. Of course, the foregoing technique may be extended to mirror displacements beyond twice the maximum unbalance range providing each change of sign can be recognized.

Figure 10:
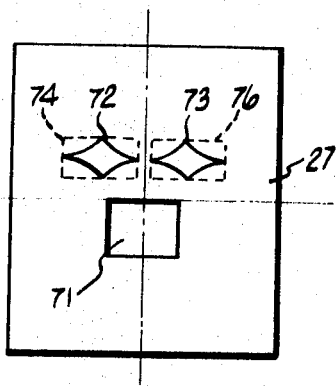

For certain purposes, optical gratings providing a nonlinear output may be more advantageous than those providing an output linearly proportional to mirror angles. FIG. 10 illustrates an opaque member or mounting plate 27 having a window 71 on the incident side and a pair of specially shaped windows 72 and 73 on the reflected side. The windows 72 and 73 are irregularly shaped so that their maximum height occurs in the center of each. The opposite side edges of the window 71 are aligned with the peaked centers of the respective windows 72 and 73 on the reflected side. Light sensors 74 and 76 are mounted to a suitable sensor mounting plate, not shown, behind the reflected side of the grating plate 27. If the light sensors 74 and 76 are suitably connected in a bridge circuit or in a balanced output circuit, such as those previously discussed, the instrument may be made to have the greatest possible sensitivity when the image of the edges of the window 71 is focused near the peaked centers of the windows 72 and 73. With deviation from this position, the sensitivity gradually decreases with the error signal polarity indicating the direction in which correction must be made. A servomechanism, for example, may be controlled by such an instrument.

On the other hand, many servomechanisms are faster, although free from oscillation, when made more reactive with higher unbalance than near the zero point of the optical lever. By suitably shaping the incident and reflected side windows or gratings, the optical lever may be given such a property.

It should be noted that, although the embodiments and arrangements previously discussed are primarily for producing an analog indication of the amplitude of the mirror swing, the optical lever output need not be limited to indication such a parameter. For example, by utilizing very fine optical gratings in connection with large angles of mirror displacement, a variable frequency output will result. The output frequency will be analogous to the angular velocity of the mirror.

Figure 11:
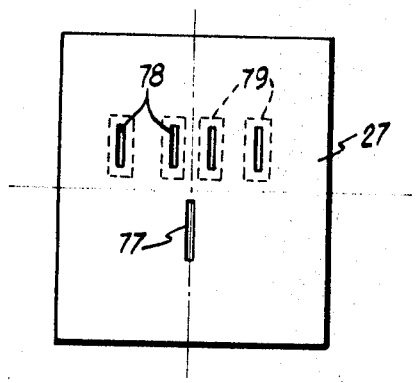

By way of further example, the use of very narrow windows permits a variety of possible outputs as a function of mirror position. An embodiment of the latter is illustrated in FIG. 11 wherein the mounting plate 27 has a single very narrow slot or window 77 on the incident side, and a plurality of slots or windows 78 on the reflected side. Light sensors 79 are mounted behind the windows 78 and are suitably connected to provide the desired output. The spacing of the windows 78 is selected for the desired mirror displacement to be sensed and, upon sufficient displacement of the mirror, the image of the window 77 will fall upon one of windows 78 to light the sensor behind same.

By combining the techniques previously discussed, the optical lever of the invention may be designed for use in a digital system wherein the period and frequency of mirror oscillation may be read out. An illustration of an arrangement for the mounting plate 27 which will provide such an output is indicated in FIG. 12. Two narrow slots 81 and 82 are provided on the incident and reflected sides of the plate 27, respectively. A light sensor 83 is mounted to a suitable mounting plate, not shown, behind the reflected side so that the sensor 83 is immediately behind the slit 82. When the mirror oscillates, the time difference between the pulses generated by the light sensor 83 at the coincidence of the image of the slit 81 on the slit 82 is equal to half of the oscillation period, assuming the mirror is exactly centered. If the mirror is not exactly centered, the period can still be determined in accordance with the elapsed time between every other pulse.

The amplitude of the mirror oscillation in the arrangement of FIG. 12 is determined by a single optical grating 84, half of which is on the incident side and half of which is on the reflected side. The optical grating 84 is a very fine grid and, for amplitudes of mirror displacement larger than the maximum unbalance, the output of the light sensor 86 located behind the reflected side of grating 84 is oscillatory at a frequency which is analogous to the angular velocity of the mirror. The number of cycles of this oscillation counted during the interval separating the period pulses produced by the light sensor 83 is analogous to the mirror amplitude.

Thus, by combining oscillation production techniques with intermittent pulse or mirror position techniques, the amplitude of the mirror oscillation may be read out digitally. The readout values may be obtained from a pair of conventional counters triggered by the period pulses produced by the light sensor 83. The period counter counts a standard frequency, while the other counts the cycles of the frequency modulated signal produced by the light sensor 86, which signal contains the amplitude information. Printing of the readings may be obtained with standard printers.

Thus far, the optical lever of the invention has been described in connection with detecting and measuring the angular displacement of a mirror about one axis of rotation. It is possible to utilize more than one reference axis, however, and an example of this is illustrated in FIG. 13.

The grid arrangement in FIG. 13 is for sensing rotation of the mirror about two mutually perpendicular axes, however, by suitably orienting the gratings as will be subsequently described, it will be apparent that rotation about other axes may also be detected and measured.

The arrangement illustrated in FIG. 13 utilizes two optical gratings mounted on the grating mounting plate 27. The grating 87 is utilized as two separate identical optical gratings by placing the optical grating 87 such that one half is on the incident side of the mounting plate and the other half is on the reflected side. A solar cell 88 is disposed behind the reflected side of the optical grating 87. Similarly, an optical grating 89 is also utilized as two identical optical gratings by placing one-half of the optical grating 89 on the incident side of the mounting plate and the other half on the reflected side. A solar cell 91 is disposed behind the portion of the optical grating 89 on the reflected side.

In order to sense the desired angular displacement of the mirror about the two axes of rotation, the bars of each of the optical gratings 87 and 88 are made parallel with a respective one of the axes. Thus, in the illustrated embodiment, the bars of the optical gratings 87 and 88 are vertical whereas the bars of the optical gratings 89 and 91 are horizontal. Upon displacement of the mirror, the angular component of mirror rotation about the vertical axis will be sensed by the light sensor 88. Similarly, the component of angular displacement of the mirror about the horizontal axis will be sensed by the light sensor 91. Thus, both vertical axis and horizontal axis modes of angular displacement of the mirror are simultaneously sensed by the instrument.

Due to imperfactions in the condenser lens, the optical gratings, and the light responsive devices, the linearity of the output of an optical lever may be somewhat impaired. By suitably calibrating the instrument, it may be possible to compensate for these deviations. In addition, if an amplifier is utilized to amplify the output of the light responsive devices, deviation compensation may be designed into the electrical circuitry of the amplifier. Although corrections of the type described are possible, a first order correction of nonlinear characteristics may be easily achieved by appropriately shaping areas of the optical gratings or windows, or by masking or desensitizing appropriate areas of the light responsive devices. Shaping of the windows has been previously discussed in connection with providing nonlinear outputs. The masking or desensitization of the light sensors is illustrated particularly in FIG. 14.

FIG. 14 is an enlarged view of the upper portion of the light responsive device mounting plate 31 of FIG. 7, and is utilized by way of example only. It will be noted that masked areas 92 have been provided on certain areas of the light responsive devices or sensors 57, 66 and 64. These masked areas are shaped to compensate the system for nonlinear characteristics which it is desired to eliminate The desensitization or masking may be achieved through the use of suitable opaque tape or similar material. The shape of the masked area depends upon the imperfections of the light sensors themselves, the nonuniformity of the light beam, and the geometric distortion produced by the lenses at high light beam angles.

The optical lever of the invention is capable of being used in a wide variety of detecting and measuring systems. One such system, utilizing an optical lever 93 attached to a chart recorder 94, is illustrated in FIG. 15. The illustrated system is for detecting and measuring changes in pressure in an enclosure having a Bourdon tube 96 communicating therewith. The closed end of the Bourdon tube has a mounting plate 97 fixed thereto and the mounting plate 97 will move in response to variation in pressure sensed by the Bourdon tube.

In order to translate this generally linear mechanical motion into angular displacement of a mirror to be sensed by the optical lever 93, a resiliently flexible ribbon 98 is utilized. The ribbon 98 may be made of thin spring steel or other suitable material and is bent through an arc of approximately 180°. One end of the ribbon is secured to the plate 97 and the other end of the ribbon is secured to a further plate 99. The plate 99, during operation of the system, is fixed with respect to the movement of the closed end of the Bourdon tube, but may be suitably adjustable for calibration of the instrument. A mirror 101 is attached to the ribbon 98 in the middle of the 180-degree arc formed thereby. Attachment is made by a suitable attaching stud 102 so that a small motion of the end of the Bourdon tube creates a rotation of the mirror. It is to be pointed out that this type of transducer may be utilized in connection with types of measuring instruments other than optical levers.

In the illustrated embodiment, the angular displacement of the mirror will be equal to the arc tangent of the quotient $d/D$ where $d$ equals the linear displacement of the end of the Bourdon tube and D equals the diameter of the 180-degree arc through which the ribbon 98 is bent. It will therefore be observed that with a very small diameter bend in the ribbon 98, a high sensitivity will be achieved. The translation of the linear displacement of the end of the Bourdon tube into rotational displacement of the mirror is achieved without any slipping or sticking in the linkages and without any hysteresis effects.

In FIG. 16, a system is shown utilizing the optical lever 93 and chart recorder 94 for detecting the strain of a rod 103. The rod is fixed at one end, and the opposite end is free to move relative to the fixed end. A bent flexibly resilient ribbon 104, similar to the ribbon 98 of FIG. 15, has one end secured to the free end of the rod 103 and the other end secured to an element 106. The fixed end of the rod 103 and the element 106 are fixed relative to each other. As was the case in connection with the system of FIG. 15, the ribbon 104 is bent through an arc of approximately 180° and a mirror 107 is attached to the midpoint of the arc. The optical lever 93 senses the rotational displacement of the mirror, which will be proportional to the strain of the rod 103. If desired, the rod may be maintained at a constant temperature to minimize the effects of thermal expansion. As was the case in connection with the system of FIG. 15, the sensitivity of the system is inversely proportional to the diameter of the arc through which the ribbon 104 is bent. Also, as was true with the system of FIG. 15, the effects of hysteresis, sticking and slipping, are avoided.

It may, therefore, be seen that the invention provides an improved detecting and measuring device and a measuring and detecting system for utilizing same. More particularly, the invention provides an improved optical lever capable of a wide variety of applications and being highly versatile in its application. The optical lever of the invention exhibits high sensitivity over a wide dynamic range and is of sturdy construction and low cost.

Because the versatility of the optical lever of the invention is attained through the use of a readily replaceable plate assembly, it is economically feasible to produce such optical levers by mass production technique. All optical levers produced may be identical except for the plate assembly containing the gratings, windows and light sensors. The latter may be designed for the particular needs of a customer and inserted in one of the mass produced instruments prior to delivery. Furthermore, the customer may change the optical lever characteristics to suit his changing needs merely by replacing the plate assembly with a different one.

What is claimed is:

1. An optical lever for detecting the angular displacement, from a reference position, of a mirror about an axis of rotation, including in combination, means for producing an incident light beam directed at the mirror, a first optical grating positioned in the path of the incident light beam for partially obstructing same, means positioned to be in the path of the light beam reflected from the mirror at a predetermined displacement of the mirror for sensing the intensity of the reflected light beam, a second optical grating positioned in the path of the reflected light beam between the mirror and said sensing means, said light beam producing means and said sensing means being positioned so that, during operation of said optical lever with the mirror in the reference position, the axis of the incident light beam and the axis of the reflected light beam are in a plane which is generally parallel with the axis of rotation of the mirror, said optical gratings having opaque bars extending parallel with the axis of rotation of the mirror, said first optical grating being of larger dimension than said second optical grating in the direction perpendicular to said opaque bars to provide periodic variation in intensity of the reflected light beam between maximum and minimum levels with displacement of the mirror.

2. An optical lever in accordance with claim 1 wherein means are included for focusing the light beam on the mirror and for focusing the reflected light beam on said sensing means.

3. An optical lever in accordance with claim 2 wherein said sensing means comprise at least one light responsive device positioned to intercept the reflected light beam immediately past said second optical grid.

4. An optical lever in accordance with claim 1 wherein said first and second optical gratings are coplanar.

5. An optical lever in accordance with claim 4 wherein said first and second optical gratings are adapted to be positioned with their mutual plane being substantially parallel with the plane of the mirror in the reference position.

6. An optical lever in accordance with claim 1 wherein said first and second gratings are defined by first and second opaque members, and wherein said opaque members are provided with a plurality of openings therein of predetermined shape, said openings being adapted for alignment with respective portions of the incident and reflected light beams, said sensing means being positioned to provide a plurality of outputs corresponding to different ranges of mirror displacement.

7. An optical lever in accordance with claim 1 wherein said sensing means include a first device for sensing displacement of the mirror about the axis of rotation, and include a second device for sensing displacement of the mirror about a further axis of rotation which is perpendicular to the first named axis of rotation.

8. An optical lever for detecting the angular displacement, from a reference position, of a mirror about two mutually perpendicular axis of rotation, including in combination, means for producing an incident light beam directed at the mirror, first light sensing means positioned to be in the path of the light beam reflected from the mirror at a predetermined displacement of the mirror about one of the axis, and second light sensing means positioned to be in the path of the light beam reflected from the mirror at a predetermined displacement of the mirror about the other of the axis, wherein first and second opaque members are positioned to be in the path of the incident light beam for partially obstructing same, wherein third and fourth opaque members are positioned to be in the path of the light beam reflected from the mirror for partially obstructing the reflected light beam, and wherein means are provided for focusing the reflected image of said first opaque member in the plane of said third opaque member and for focusing the reflected image of said second opaque member in the plane of said fourth opaque member.

9. An optical lever in accordance with claim 8 wherein said first and third opaque members comprise gratings having a plurality of mutually parallel elongated opaque bars extending parallel with the plane of the light beam axis with the mirror in the reference position, and wherein said second and fourth opaque members comprise optical gratings having a plurality of mutually parallel elongated opaque bars extending perpendicularly of the plane of the light beam axis with the mirror in the reference position.

10. An optical lever for detecting the angular displacement, from a reference position, of a mirror about an axis of rotation, including in combination, a housing having locating means therein, a light source supported in said housing at a predetermined position with respect to said locating means and adapted to produce an incident light beam directed at the mirror, a condenser lens supported in said housing at a predetermined position with respect to said locating means to be in the path of the incident light beam and adapted to collimate the rays of the incident light beam, a removable plate supported in said housing and being positioned therein by slidably engaging said locating means, said removable plate having a first opaque member positioned to be in the path of the incident light beam for partially obstructing same, said removable plate further having a second opaque member displaced from said first opaque member to be in the path of the light beam reflected from the mirror for partially obstructing the reflected light beam, an objective lens supported by said housing at a predetermined position with respect to said locating means for focusing an image of said first opaque member on the mirror and for focusing the reflected image of said first opaque member in the plane of said second opaque member, and transducer means positioned to intercept the reflected light beam passing said second opaque member for sensing the amount of light passing said second opaque member, said predetermined positions of said light source and said objective lens and said transducer means being such that, during operation of said optical lever with the mirror in the reference position, the axis of the incident light beam and the axis of the reflected light beam are substantially coplanar with the axis of rotation of the mirror.

11. An optical lever in accordance with claim 10 wherein said light source and said objective and said transducer means are positioned so that, with the mirror in its reference position, the angle between the axis of the incident light beam and the axis of the reflected light beam will be equal to twice the arc tangent of the following quotient: the dimension of the largest area of the plane of the removable plate which can be uniformly lighted by said condenser lens divided by the sum of the focal length of said objective lens and the distance between said objective lens and the mirror.

12. An optical lever in accordance with claim 10 wherein said transducer means comprise at least two light responsive devices supported on a mounting plate secured to said removable plate and located immediately behind said removable plate, and wherein a single strip of material having a high heat conductivity is positioned directly between said light responsive devices and said mounting plate therefor, said strip thereby maintaining said light responsive devices at substantially the same temperature notwithstanding differential lighting of the surfaces of said light responsive devices.

13. An optical lever for detecting the angular displacement, from a reference position, of a mirror about an axis of rotation, including in combination, means for producing an incident light beam directed at the mirror, means positioned to be in the path of the light beam reflected from the mirror at a predetermined displacement of the mirror for sensing impingement of the reflected light beam, a first opaque member positioned to be in the path of the incident light beam for partially obstructing same, a second opaque member positioned to be in the path of the light beam reflected from the mirror for partially obstructing the reflected light beam, said first and second opaque members each including a slit, sensing means positioned behind said slit in said second opaque member for sensing the coincidence therewith of the image of said slit on said first opaque member for indicating the oscillation period of the mirror, and further sensing means positioned behind said optical grating on said second opaque member for sensing the repeated cycles of light passing same, whereby a digital output of displacement may be derived in accordance with the number of cycles sensed by said further sensing means in each one-half oscillation period.

14. An optical lever for detecting the angular displacement, from a reference position, of a mirror about an axis of rotation, including in combination, a light source adapted to produce an incident light beam directed at the mirror, a condenser lens positioned to be in the path of the incident light beam and adapted to collimate the rays of the incident light beam, a plate supporting a first opaque member in the path of the incident light beam for partially obstructing same, said plate further having a second opaque member displaced from said first opaque member to be in the path of the light beam reflected from the mirror for partially obstructing the reflected light beam, an objective lens supported for focusing an image of said first opaque member on the mirror and for focusing the reflected image of said first opaque member in the plane of said second opaque member, transducer means positioned to intercept the reflected light beam passing said second opaque member for sensing the amount of light passing said second opaque member, said light source and said objective lens and said transducer means being positioned so that, during operation of said optical lever with the mirror in the reference position, the axis of the incident light beam and the axis of the reflected light beam are substantially coplanar with the axis of rotation of the mirror, and so that, with the mirror in its reference position, the angle between the axis of the incident light beam and the axis of the reflected light beam will be equal to twice the arc tangent of the following quotient: the dimension of the largest area of the plane of the removable plate which can be uniformly lighted by said condenser lens divided by the sum of the focal length of said objective lens and the distance between said objective lens and the mirror.

References Cited

UNITED STATES PATENTS

| | | | |
|---|---|---|---|
| 2,065,365 | 12/1936 | Doyte et al. | 250—230 X |
| 2,329,423 | 9/1943 | Steghart | 340—190 X |
| 2,420,159 | 5/1947 | Wineman | 250—231 X |
| 2,449,953 | 9/1948 | Rippingille | 250—231 X |
| 2,497,042 | 2/1950 | Doll | 340—190 |
| 2,586,540 | 2/1952 | Holden | 250—231 X |
| 2,816,283 | 12/1957 | Steele | 340—190 |
| 3,277,367 | 10/1966 | Petersen | 250—230 X |
| 3,364,813 | 1/1968 | McKinney | 250—230 X |
| 3,384,754 | 5/1968 | Albarda | 250—230 X |
| 3,389,267 | 6/1968 | Acoasky | 250—238 |
| 3,242,795 | 3/1966 | Hughes | 250—203 X |
| 3,367,194 | 2/1968 | Diamantides | 74—5.6 |
| 3,470,377 | 9/1969 | Le Febre et al. | 250—203 X |

OTHER REFERENCES

Rogers and Ruocchio, "Optical Reader," vol. 8, No. 10, March 1966, p. 1445.

WALTER STOLWEIN, Primary Examiner

CHARLES M. LEEDON, Assistant Examiner

U.S. Cl. X.R.

250—231; 340—190; 356—140, 147